No. 877,728. PATENTED JAN. 28, 1908.
M. O'BRIEN.
HAME STRAP.
APPLICATION FILED NOV. 21, 1906.

Witnesses:
Winnifred F. Risley
E. P. De Giorgi

Inventor:
Mathew O'Brien
per:
Risley & Love
Attorneys.

UNITED STATES PATENT OFFICE.

MATHEW O'BRIEN, OF PORT LEYDEN, NEW YORK.

HAME-STRAP.

No. 877,728.   Specification of Letters Patent.   Patented Jan. 28, 1908.

Application filed November 21, 1906. Serial No. 344,398.

*To all whom it may concern:*

Be it known that I, MATHEW O'BRIEN, a citizen of the United States, residing at Port Leyden, in the county of Lewis and State of New York, have invented certain new and useful Improvements in Hame-Straps, of which the following is a specification, reference being had therein to the accompanying drawing.

My invention relates to an improved hame strap, and I declare that the following is a full, clear, concise and exact description thereof sufficient to enable one skilled in the art to make and use the same, reference being had to the accompanying drawings in which like letters and numerals refer to like parts throughout.

The invention includes a device for securing the hames on the collar of an animal, it being applied to links or rings in the lower ends of the hames gathering them under the collar, the upper ends being secured by suitable means.

Figure 3:
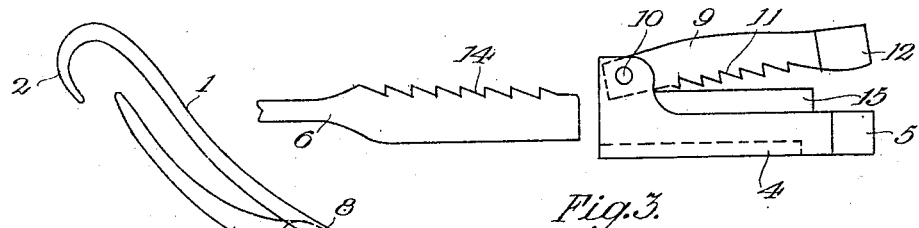
Figure 1:
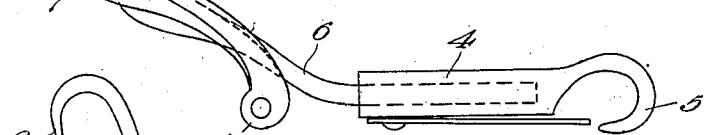
Figure 2:
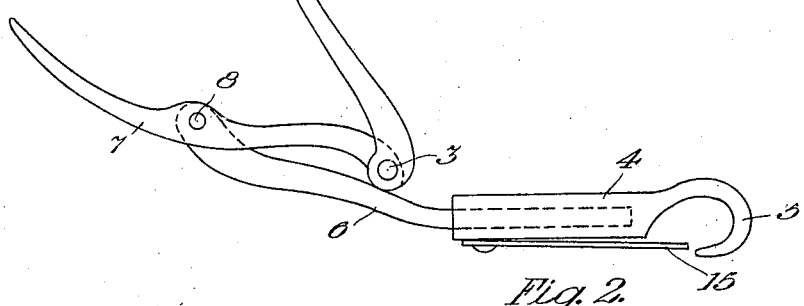
Figure 4:
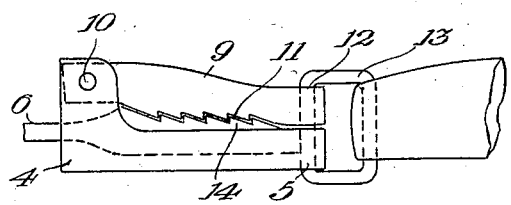

In the drawings Figure 1 is a side view of the device in substantially closed position and Fig. 2 is a like view in open position. Fig. 3 is a plan view of parts disconnected, but which are shown in connected position in Fig. 4.

The device comprises two hooked members, one at each end, with means for adjustably connecting the same, there being lever members provided between the two to hold them in locked position on the collar.

Referring to the figures in detail, 1 represents one of the hooked members having the hook portion 2 at its outer end and at the other end being curved downwardly to form a pivotal bearing at 3 for the other connected parts.

4 is the hooked member at the other end of the device with the hook 5 at its outer end.

6 is an adjustable connecting bar to connect the hooked members, one end being adjustably and removably secured in the hooked member 4 and the other end being connected with the other hooked member 1. This connection is made by a lever 7 pivoted on member 1 at 3 and adapted to swing to and from the under-face of the hooked member 1. At a point, indicated by 8, the connecting bar 6 is pivoted on the lever 7. As the lever member 7 is swung in and out the bearing point or point of strain of the bar 6 is carried in the periphery of a circle whose center is the point 3, so that in the position shown in Fig. 1 the parts are locked in closed position.

The hooked member 4 is divided into two parts, or rather has a secondary part or hook 9 pivoted on the main portion at 10 and having its inner edge notched as shown at 11. When this hooked member is swung to the opposite part 4, their ends, where hooked at 5 and 12, are of a width substantially to fill the transverse space in the hame link 13 which holds the parts in closed position. The bar 6 has teeth or notches 14 which engage the notches 11 on the member 9 when the hooks 5 and 12 are together. It will, of course, be understood that member 4 is fashioned in such manner as to furnish confines for the member 6 when it is thrust into the hook jaw for engagement therewith, and it will also be understood that the adjustment of the bar 6 in the member 4 is made according to the space between the hame rings at hook 2 and hook 5. A spring 15 is mounted on the member 4, the end of which provides a releasable closure for the hook 5.

Having described my invention, what I claim as new and desire to secure by Letters Patent, is:

1. In a device of the character described, hame engaging means, means therebetween for adjustably connecting the same comprising a toothed member adapted to engage at one end teeth in one of the hame connecting means and at the other end being swingably mounted to be swung into locked position, the said hame connecting means having teeth and consisting of two parts, hinged at one end to allow opening the parts and at the other end each hooked to engage the hame ring, substantially as described.

2. In a device of the character described, hooked members and lever members for connecting the same, one of said hooked members being composed of two hooked portions adapted when closed to engage in the hame ring but to be separated to admit insertion of one of the lever members, one of said lever members and one of said hooked members being provided with interengaging teeth to hold them in adjustable connection.

3. A hame fastening comprising hame hooking members, one of them having a lock lever carrying a toothed member pivoted thereon, the other member being composed of parts adapted to receive the toothed member in adjustable position and to be held closed thereon by the engagement of the parts of said member with the hame.

In testimony whereof I affix my signature in presence of two witnesses.

MATHEW O'BRIEN.

Witnesses:
R. T. STOCKTON,
M. HANRAHAN.